Patented Aug. 31, 1937

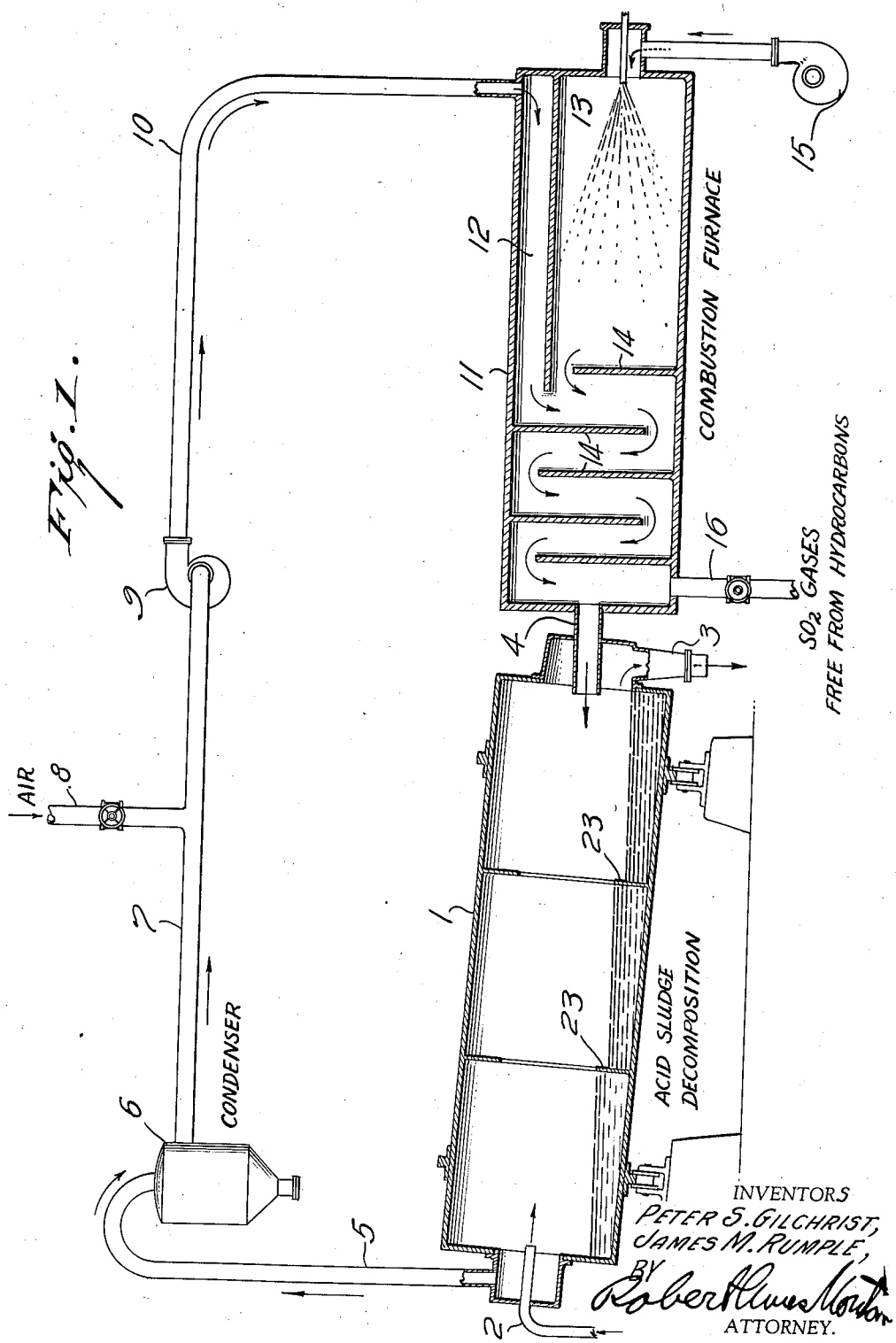

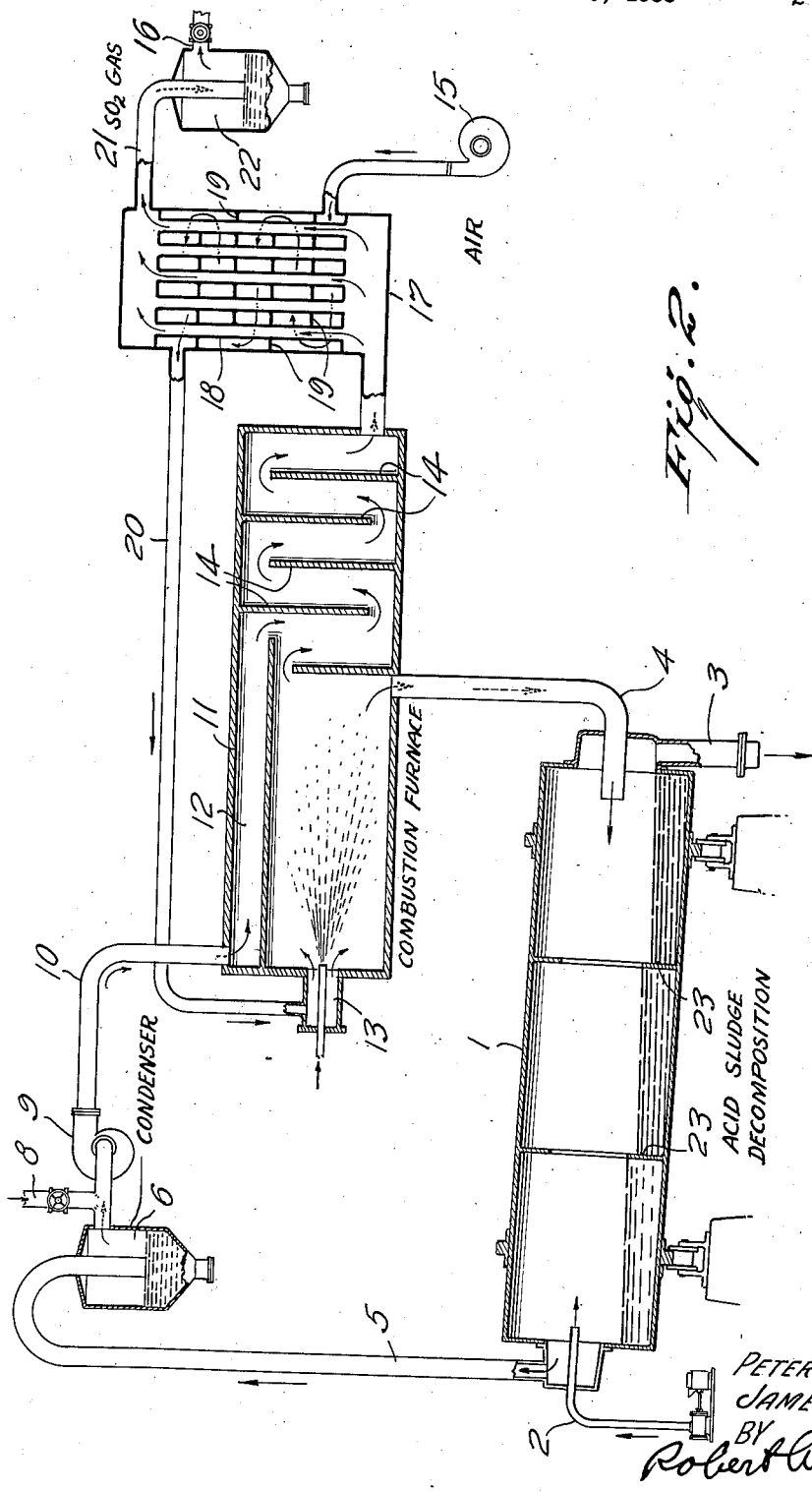

2,091,943

UNITED STATES PATENT OFFICE 2,091,943

PRODUCTION OF SO₂ FROM ACID SLUDGE

Peter S. Gilchrist, Charlotte, N. C., and James M. Rumple, St. Louis, Mo., assignors to Chemical Construction Corporation, New York, N. Y., a corporation of Delaware Application December 6, 1933, Serial No. 701,138

6 Claims. (Cl. 23—177)

This invention relates to the production of $SO_2$ gases from acid sludge obtained by the sulfuric acid purification of carbonaceous material, and more particularly relates to the production of $SO_2$ gases free from hydrocarbons or other combustibles and of sufficient strength for use in the contact sulfuric acid process or for other purposes.

The problem of producing sulfuric acid from acid sludges, particularly the acid sludges from the sulfuric acid purification of petroleum products which had long been a serious problem in the art, was first solved satisfactorily by the direct heating of acid sludge in rotary kilns using hot combustion gases as a heating agent. This process is described in the application of Ingenuin Hechenbleikner, Serial No. 568,050, now Patent No. 1,953,225. This process which offered the first commercial solution, produced a gas containing $SO_2$ and hydrocarbons, some of which were not condensable and as the hydrocarbons on passing through a sulfuric acid converter, are oxidized to form water, a serious difficulty arose due to the formation of acid mist on cooling the converted gases which presented serious corrosion and absorption problems.

This difficulty was solved by burning the uncondensable hydrocarbons, for example as described in the copending application of Hechenbleikner and Mast, Serial No. 693,136, filed October 11, 1933. This modification of the original Hechenbleikner process produces a gas which is free from hydrocarbons and which therefore does not produce any mist in the converter when used to make sulfuric acid by the contact method. However, in order to burn out the uncondensable hydrocarbons it is necessary to introduce air which causes a large amount of dilution because, of course, there are 4 volumes of nitrogen for every volume of oxygen actually used in the combustion. When large amounts of uncondensable hydrocarbons are present the dilution which results becomes excessive and the gas is too low in $SO_2$ for satisfactory use in the contact process or even when not below the absolute minimum for operative strength the more dilute gas reduces the capacity and to some extent the conversion efficiency of the sulfuric acid converter and necessitates a considerable added expense for the larger converters required for a given output of acid. Because of this dilution the Hechenbleikner, and Hechenbleikner and Mast processes have been somewhat restricted in the scope of acid sludges with which they can be used effectively, and in general while they are very suitable for low oil-high acid sludges their efficiency is seriously impaired when it is attempted to use them with high oil sludges.

The present invention, which is an improvement or modification of the Hechenbleikner and Hechenbleikner and Mast processes, retains all the advantages of these processes such as satisfactory sludge decomposition, hydrocarbon free gas and reliable operation, and at the same time the dilution which is introduced by hydrocarbon removal is greatly decreased or entirely eliminated so that the process of the present invention is capable of being used with practically any acid sludge even one which is high in oil or other constituents which produce uncondensable or difficultly condensable hydrocarbons. The present process essentially passes all of the gases given off from the decomposition of the sludge after condensation of water and condensable oils and addition of combustion air through the combustion furnace which furnishes the combustion gases for heating the sludge in the kiln. A portion of the gases after combustion are continuously bled off from the system and pass on to a contact sulfuric acid converter or to other apparatus if the $SO_2$ gas is to be used for other purposes. In this way the hydrocarbon content of the gases is utilized as fuel, and but little if any dilution results.

The present invention should not be confused with the modification described and claimed in the patent to Hechenbleikner No. 1,900,239 of March 7, 1933. In this patent a portion of the gases, after condensation, are recirculated through the combustion furnace for the retort or kiln, the object being to reduce the maximum temperatures in the furnace and prevent damage to the furnace lining by reason of excessive temperatures. Of course an additional strengthening of the $SO_2$ gas content is effected. However, the recirculation of a small portion of the gases does not solve the problem of hydrocarbon removal and dilution since the gases bled off from the circulating system in the prior Hechenbleikner patent still contain their full content of uncondensable hydrocarbons and therefore if the hydrocarbons are to be removed by burning, the same dilution problem arises as with an ordinary Hechenbleikner or Hechenbleikner and Mast process. Of course the recirculation of a portion of the gases will slightly increase the concentration of $SO_2$ given off by the kiln so that a somewhat higher dilution can be tolerated. In other words, the modification of the Hechenbleikner patent permits using the ordinary process with sludges of somewhat higher oil content than would be satisfactory with the unmodified Hechenbleikner process but no complete removal of hydrocarbons is effected and even with sludges which are sufficiently low in their oil content to make the process of the patent commercially feasible, additional hydrocarbon burning equipment is necessary and a more expensive and more complicated installation is necessary than in the present invention in which a single furnace performs the dual function of hydrocarbon removal and production of combustion gases for the sludge decomposition.

While the present process in its broader aspects includes any modification in which all of the hydrocarbon containing $SO_2$ gas is burned in the combustion furnace for the kiln and gases for the contact plant are bled off from this furnace, it is desirable in some cases to utilize substantially all of the heat of the hydrocarbons instead of only a portion and in more specific aspects the present invention includes such systems in which substantially all of the heat of combustion of the hydrocarbons is utilized and a cool gas is furnished to the contact or other $SO_2$ utilizing system. Such more perfected systems are desirable where a maximum of fuel economy is required even at the expense of a somewhat greater apparatus cost.

The invention will be described in greater detail in conjunction with the drawings in which Fig. 1 is an elevation partly in section of a system in which a portion of the heat of the hydrocarbon is utilized; and Fig. 2 is an elevation partly in section of a system in which all of the heat of combustion of the hydrocarbons is utilized.

In the drawings in Fig. 1 the sludge decomposition kiln is shown at 1 consisting in three zones separated by baffles 23 through which the sludge entering through the sludge inlet 2 passes slowly in countercurrent to a stream of hot combustion gases introduced through the hollow trunnion 4. This is the standard type of Hechenbleikner kiln and is shown in semi-diagrammatic form. The temperatures in the zones in the kiln are substantially the same as described in the Hechenbleikner Pat. No. 1,953,225 above referred to, that is to say, the inlet combustion gases have a temperature from 1500° to 2500° F. and the exit gases from 240° to 260° F. The first zone of the kiln where the fresh solution enters is maintained at a temperature of from 212 to 300° F. The second zone to the center of the kiln where the main decomposition to $SO_2$ takes place is maintained at 300 to 400° F. and the third zone where the partly decomposed sludge is transformed into a fuel is maintained at 400 to 420° F. In fact the drawings are largely diagrammatic, the invention not being concerned with any particular detail of apparatus structure. The gases evolved by the decomposition of the sludge and containing $SO_2$, water and hydrocarbons, pass out through the pipe 5, into the condenser 6, which may be of any desired type. The residue from the sludge decomposition which is a useful fuel, is discharged through the coke discharge 3.

After passing through the condenser 6 in which water and condensable hydrocarbons are removed, the gases flow through the pipe 7 into which is introduced combustion air through the valved pipe 8 and the mixed gases are then forced by the blower 9 through the pipe 10 into the preheating chamber 12 of the combustion furnace 11. After passing through this chamber and being preheated they mix with the combustion gases from the oil burner 13 which is actuated by air blast from the blower 15 and combustion is completed in the later part of the furnace where an elongated flame travel is assured by the baffles 14 which may be of suitable refractory material or which may be provided with refractory linings. These baffles also serve to mix the $SO_2$ gas with the combustion gases from the oil burner to form a uniform mixture. A portion of the gas is continuously bled off through the valved pipe 16 where it passes to a contact or other $SO_2$ utilizing plant. The gas is of course free from hydrocarbons and other combustibles and can be cooled, mixed with air, dehydrated and oxidized in a contact plant in the usual manner.

It will be apparent that the system as shown in Fig. 1 utilizes the hydrocarbons in the $SO_2$ gas as fuel and a relatively strong $SO_2$ gas is given off from the kiln because the combustion gases entering contain a considerable portion of $SO_2$. The fuel requirements are, of course, very markedly decreased by the extent to which the heat from the hydrocarbons in the $SO_2$ gas is utilized. As fuel costs are in some cases a considerable item of the sludge decomposition costs, this saving is of real importance.

The combustion of auxiliary fuel is shown as effected by an oil burner. Naturally, of course, any other suitable combustion source may be employed such as natural gas, or even powdered coal. This permits utilizing the coke which is produced as a residue from the decomposition of the sludge where such utilization is economically desirable and warrants somewhat greater burner costs.

It will be apparent that the system shown in Fig. 1 when contrasted with the system of the Hechenbleikner and Mast process described in the copending application above referred to, saves one piece of apparatus namely the hydrocarbon combustion furnace, making a single combustion furnace perform the dual functions of producing hot combustion gases for the sludge decomposition and burning out the hydrocarbons in the $SO_2$ gas. At the same time an effective utilization of a considerable portion of the heat from the hydrocarbons is also enjoyed and an important saving in fuel results. The $SO_2$ gas coming off through the pipe 16 is also of higher $SO_2$ content. When the $SO_2$ is used in a contact sulfuric acid process this permits operating converters of given sizes at higher capacity where this is desirable.

While a very effective process is shown in the modification of Fig. 1, there is one source of loss, namely, the heat in the gases passing out through the pipe 16 which are, of course, at flame temperature and represent a considerable heat loss which also increases the amount of cooling water required in condensers. Therefore in some installations it is desirable to utilize this heat and this may be effected in the modification shown in Fig. 2 in which the same apparatus bears the same reference numerals as in Fig. 1.

The operation of the kiln in Fig. 2 is exactly the same as in Fig. 1 but instead of bleeding off a portion of the combustion gases directly to a contact plant, a rough separation takes place in the furnace since the outlet for gases in the kiln is situated beyond the wall 12 of the preheating chamber so that for the most part combustion gases from the oil burner 13 flow through pipe 4. The $SO_2$ gases after leaving the preheating chamber 12 mix with a portion of the flame gases from the burner and hydrocarbons are burned out as in Fig. 1, the hot $SO_2$ gases pass through the heat exchanger 17 flowing through the tubes 18 and thence out through the pipe 21 into the condenser 22 from which they flow through the valved pipe 16 to a contact or other $SO_2$ utilization plant. Air from the blower 15 is forced by the baffles 19 in a zig zag path around the tubes 18 and becomes preheated by the heat of the hot $SO_2$ gases. This highly heated air leaves the heat exchanger through the pipe 20 and passes into the oil burner 13. All of the heat given off in the heat exchanger 17 is therefore returned to the system in the form of hot combustion air which, of course, decreases the amount of fuel required by the burner 13 and increases the temperature of the combustion gases passing into the kiln. This increase in temperature of the combustion gases represents not only a saving in fuel but also a saving in volume of combustion gases per unit of heat. Therefore, a more concentrated $SO_2$ gas is given off from the kiln and consequently a more concentrated $SO_2$ gas passes on to the contact plant. The proportion of the gases flowing through the kiln and to the contact plant may, of course, be adjusted by suitable adjustment of the valve in the pipe 16. This will result in a greater or lesser recirculation of hot $SO_2$ through the kiln and any desired degree of strength of $SO_2$ gas can be obtained by proportioning the amount recirculated. This modification utilizes all of the heat of the hydrocarbons in the $SO_2$ gas usefully and represents a system giving an ideal overall economy. This economy of course is obtained at the expense of additional equipment, the heat exchanger, and in installations where fuel costs are extremely low, it may be desirable to utilize the modification shown in Fig. 1. This is an economic problem and will be decided by the chemical engineer in accordance with the relative importance of first cost and operating cost in the total cost of sludge decomposition. Naturally, of course, the extent to which the heat of the hydrocarbons is utilized in the modification shown in Fig. 2 will depend on the size of the heat exchanger 17, and in some cases it may be desirable to use a smaller heat exchanger which will not remove quite as great an amount of heat but which will represent a somewhat smaller capital investment. In general, however, this result can be brought about by a somewhat greater proportion of recirculation of the gases through the kiln. The present invention, it will be apparent, is flexible and the precise compromise between apparatus cost and operating economy will be chosen in each installation after taking into consideration the conditions and factors present. It is an advantage of the present invention that it is very adaptable and may be applied to practically all acid sludge decomposition plants permitting a high degree of economy by adopting the compromise best suited to the particular plant.

The drawings, of course, are primarily diagrammatic in nature. The particular design of kiln, combustion furnace, and the like, shown in the drawings, are in no sense to be considered as limiting the invention, they are merely illustrative. Thus, for example, in the combustion furnace a type of furnace similar to the straight hydrocarbon combustion furnace shown in the copending application of W. C. Mast Serial No. 700,438, filed December 1, 1933, now Patent No. 2,021,372 dated November 19, 1935, is illustrated. This is a very satisfactory type to use but any other design may be employed and of course in the present invention the particular design of furnace is not claimed as this structural design forms the subject matter of the Mast invention described and claimed in the copending application above referred to.

The invention has been illustrated in conjunction with a kiln of the Hechenbleikner type in which the sludge is passed slowly through three zones of increasing temperature, the first being maintained at a temperature at which water and light hydrocarbons are distilled; the second being maintained at a temperature at which $SO_4$ compounds are rapidly reduced to $SO_2$ substantially without formation of $H_2S$; and the third zone being maintained at a temperature to condition the carbonaceous residue to form a useful fuel. Of course the invention operates with maximum efficiency when it is used in the highly effective Hechenbleikner process. It is, however, applicable to any other type of sludge decomposition in which the sludge is exposed to direct heat of combustion gases and it should be understood that the invention is not limited in its broader aspects to the Hechenbleikner process of sludge decomposition in an internally fired kiln in zones. Of course when used with a less efficient decomposition system than that of the Hechenbleikner process, the overall efficiency will be lowered but the advantages of the present process in overcoming dilution of gases during the burning out of hydrocarbons, savings of fuel, etc. will be realized, and it should be understood that the present invention may be applied to such other less efficient decomposition systems. However, although generally applicable to all sludge decompositions using direct heat of combustion gases in a more specific form we prefer to practice the principles of the present invention in combination with the Hechenbleikner sludge decomposition kiln and such preferred modification represents maximum operating efficiency.

We claim:

1. A method of producing $SO_2$ gas free from hydrocarbons from the thermal decomposition of acid sludge obtained in the sulfuric acid purification of carbonaceous materials which comprises subjecting the sludge to direct heating by combustion gases under conditions in which a gas containing $SO_2$, water vapor and hydrocarbons is produced, condensing out water vapor and condensable hydrocarbons, admixing air with the remaining gases, passing the whole mixture through a compartment in the furnace for producing the combustion gases for the sludge decomposition, which compartment is separated from the flame of combustion by a heat transmitting wall, admixing the preheated mixture with the burning gases of combustion, providing a sufficiently elongated travel of the mixed gases to assure complete combustion of the hydrocarbon material in the $SO_2$ gas and continuously removing a portion of the $SO_2$ gas from the furnace and from the sludge decomposition circuit at a point after the combustion and before the sludge decomposition.

2. A method of producing $SO_2$ gas free from hydrocarbons from the thermal decomposition of acid sludge obtained in the sulfuric acid purification of carbonaceous materials which comprises subjecting the sludge to direct heating by combustion gases under conditions in which a gas containing $SO_2$, water vapor and hydrocarbons is produced, condensing out water vapor and condensable hydrocarbons, admixing air with the remaining gases, passing the whole mixture through a compartment in the furnace for producing the combustion gases for the sludge decomposition, which compartment is separated from the flame of combustion by a heat transmitting wall, admixing the preheated mixture with the burning gases of combustion, providing a sufficiently elongated travel of the mixed gases to assure complete combustion of the hydrocarbon material in the $SO_2$ gas, continuously removing a portion of the $SO_2$ gas from the furnace and from the sludge decomposition circuit at a point after the combustion and before the sludge decomposition, and passing the $SO_2$ gas thus removed in heat exchanging relation with at least a portion of the combustion air for the combustion, whereby said combustion air is preheated and the heat of the $SO_2$ gas is returned to the furnace.

3. A method according to claim 1 in which the sludge decomposition takes place in an internally heated kiln in which the sludge is gradually heated through a plurality of zones at least one zone being maintained at a temperature at which $SO_4$ compounds are rapidly reduced to $SO_2$ without production of $H_2S$ and the sludge is maintained in said zone for a sufficient period of time to substantially complete the operation performed in said zone.

4. A method according to claim 1 in which the sludge is decomposed in an internally heated kiln in which the sludge is gradually passed through three temperature zones, the first maintained at a temperature at which water and light hydrocarbons are distilled, the second at a temperature at which $SO_4$ compounds are rapidly reduced to $SO_2$ without production of $H_2S$, and the third zone being maintained at a temperature at which the carbonaceous residue of the sludge is conditioned to a useful fuel without substantial production of $H_2S$, said fuel being continuously discharged from the kiln.

5. A method according to claim 1 in which the combustion gases are passed in countercurrent to the movement of the sludge in an internally heated kiln, the sludge being continuously introduced at one end of the kiln and residue continuously removed from the opposite end.

6. A method according to claim 1 in which the sludge is so high in volatile hydrocarbons as to produce an $SO_2$ gas which after condensation contains an amount of uncondensable hydrocarbons sufficient so that if the hydrocarbons were burned out with air the volume of inert gases produced would dilute the $SO_2$ gas below the minimum concentration for operation of a contact sulfuric acid plant.

PETER S. GILCHRIST.
JAMES M. RUMPLE.